United States Patent
Gan et al.

(10) Patent No.: US 6,673,493 B2
(45) Date of Patent: Jan. 6, 2004

(54) DOUBLE CURRENT COLLECTOR CATHODE DESIGN USING THE SAME ACTIVE MATERIAL IN VARYING FORMULATIONS FOR ALKALI METAL OR ION ELECTROCHEMICAL CELLS

(75) Inventors: Hong Gan, East Amherst, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 129 days.

(21) Appl. No.: 09/970,341

(22) Filed: Oct. 3, 2001

(65) Prior Publication Data

US 2002/0061437 A1 May 23, 2002

Related U.S. Application Data

(60) Provisional application No. 60/249,688, filed on Nov. 17, 2000.
(51) Int. Cl.$^7$ .............................. H01M 4/64; H01M 6/00
(52) U.S. Cl. .................... 429/233; 429/232; 429/218.1; 429/219; 429/220; 429/221; 429/223; 429/224; 429/231.1; 429/231.2; 429/231.5; 429/231.7; 429/245; 429/326; 429/330; 29/623.1
(58) Field of Search .............................. 429/218.1, 219, 429/220, 221, 223, 224, 231.1, 231.2, 231.5, 231.7, 232, 233, 245, 326, 330; 29/623.1

(56) References Cited

U.S. PATENT DOCUMENTS

| | | |
|---|---|---|
| 3,520,729 A | 7/1970 | Voss et al. |
| 4,161,063 A | 7/1979 | Goebel et al. |
| 4,292,357 A | 9/1981 | Erisman et al. |
| 4,324,828 A | 4/1982 | Ebato et al. |
| 4,409,730 A | 10/1983 | Goebel |
| 4,439,916 A | 4/1984 | Faber |
| 5,180,642 A | 1/1993 | Weiss et al. |
| 5,571,636 A | 11/1996 | Ohta et al. |
| 5,582,935 A | 12/1996 | Dasgupta et al. |
| 5,639,568 A | 6/1997 | Pedicini et al. |
| 5,658,694 A | 8/1997 | Charkey |
| 5,667,916 A | 9/1997 | Ebel et al. |
| 5,670,276 A | 9/1997 | Takeuchi et al. |
| 5,716,422 A | 2/1998 | Muffoletto et al. |
| 5,744,258 A | 4/1998 | Bai et al. |
| 5,863,676 A | 1/1999 | Charkey et al. |
| 5,993,999 A | 11/1999 | Rivers et al. |
| 6,551,747 B1 * | 4/2003 | Gan .......................... 429/245 |

\* cited by examiner

Primary Examiner—Laura Weiner
(74) Attorney, Agent, or Firm—Michael F. Scalise

(57) ABSTRACT

A new sandwich cathode design is provided comprising a cathode active material mixed with a binder and a conductive diluent in at least two differing formulations. The formulations are then individually pressed on opposite sides of a current collector, so that both are in direct contact with the current collector. Preferably, the active formulation on the side of the current collector facing the anode is of a lesser percentage of the active material than that on the opposite side of the current collector. Such an exemplary cathode design might look like:

SVO (100-x % active)/current collector/SVO (100-y % active)/current collector/SVO (100-x % active), wherein x is greater than y.

42 Claims, No Drawings

DOUBLE CURRENT COLLECTOR CATHODE DESIGN USING THE SAME ACTIVE MATERIAL IN VARYING FORMULATIONS FOR ALKALI METAL OR ION ELECTROCHEMICAL CELLS

CROSS REFERENCE TO RELATED APPLICATION

This application claims priority based on provisional application Serial No. 60/249,688, filed Nov. 17, 2000.

BACKGROUND OF THE INVENTION

This invention relates to the conversion of chemical energy to electrical energy. In particular, the present invention relates to a new sandwich cathode design having a first cathode active formulation sandwiched between two current collectors and with a second cathode active formulation in contact with the opposite sides of the current collectors, the active material of the first and second formulations being the same. The present cathode design is useful for high discharge rate applications, such as experienced by cells powering an implantable medical device.

SUMMARY OF THE INVENTION

Silver vanadium oxide (SVO) is known to have high power capability. However, without the use of a conductive additive, such as carbon black, graphite, etc., in an SVO cathode active formulation, its power capability at a low percent of discharge or small depth of discharge (DOD) is significantly worse than if the conductive additive were present. The problem is that the conductive additive decreases the practical density of the cathode. In other words, the gram amount of cathode active material per unit volume is lower than that of the SVO active material without the non-active carbonaceous additives.

In conventional SVO cells, the cathode active material is always mixed with a few weight percent of carbonaceous additives along with a few weight percent of binder materials. According to the present invention, SVO material without any conductive or binder additives, or with a lesser percentage of additives, is sandwiched between two current collectors. This assembly is further sandwiched between two layers of SVO material formulated having a greater percentage of binder and conductive additives than that of the sandwich assembly. As a result, lithium cells with cathodes of this configuration have the same or higher discharge rate capability as that of conventional Li/SVO cells. At the same time, the present cell exhibits equal or higher capacity than that of a conventional cell due to the greater energy density contributed by the 100% active SVO portion sandwiched in the middle of the cathode. Higher cathode efficiency is also realized with this cathode design.

Accordingly, one object of the present invention is to improve the performance of lithium electrochemical cells by providing a new concept in electrode design. Further objects of this invention include providing a cell design for improving the capacity and utilization efficiency of lithium-containing cells.

These and other objects of the present invention will become increasingly more apparent to those skilled in the art by reference to the following description.

DETAILED DESCRIPTION OF THE PREFERRED EMBODIMENTS

The electrochemical cell of the present invention is of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. The greater the amount of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions which migrate from the negative electrode to the positive electrode into atomic or molecular forms. For a primary cell, the cathode active material comprises a carbonaceous chemistry or at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

Carbonaceous active materials are preferably prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

The metal oxide or the mixed metal oxide is produced by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which include the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein z≦5 combined with $Ag_2O$ having silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01 ≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and U.S. Pat. No. 5,516,340 to Takeuchi et al., both of which are assigned to the assignee of the present invention and incorporated herein by reference.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof are contemplated as useful active materials.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To charge such secondary cells, the lithium ion comprising the positive electrode is intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

The above described cathode active materials, whether of a primary or a secondary chemistry, are formed into a sandwich electrode body for incorporation into an electrochemical cell by mixing one or more of them with a binder material. Suitable binders are powdered fluoro-polymers, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material.

According to the present invention, any one of the above cathode active materials, whether of a primary or a secondary cell, is mixed with a binder and a conductive diluent in at least two differing formulations. The formulations are then individually pressed on opposite sides of a current collector, so that both are in direct contact with the current collector. Preferably, the first active formulation on the side of the current collector spaced from the anode is of a greater active material percentage than that of the second formulation on the opposite side of the current collector and facing the anode. In other words, the exemplary first formulation having the greater percentage of active material never directly faces the lithium anode.

A preferred second formulation for a mixed metal oxide such as SVO or CSVO has, by weight, about 94% SVO and/or CSVO, 3% binder and 3% conductive diluent as the formulation facing the anode. Then, the first active formulation in contact with the other side of the current collector has a somewhat greater percentage of SVO or CSVO.

In the case of a carbonaceous active material such as $CF_x$, the second active formulation facing the anode has, by weight, about 91% $CF_x$, 5% binder and 4% conductive diluent. Again, the first active formulation in contact with the other side of the current collector has a somewhat greater percentage of the $CF_x$ material.

Therefore, one exemplary cathode plate has the active formulations short circuited to each other by parallel connection through the current collectors with the following configuration of cathode active formulations:

(100-x)%/current collector/(100-y)%/current collector/(100-x)%, wherein x and y represent percentages of non-active materials and wherein x is greater than y.

Another embodiment of the present invention has the first formulation sandwiched between the second formulation, in which the second formulation is short circuited to the first formulation by direct contact. This cathode design has the following configuration of cathode active formulations:

(100-x)%/current collector/(100-x)%/(100-y)%/(100-x)%/current collector/(100-x)%, wherein x and y represent percentages of non-active materials and wherein x is greater than y.

Other exemplary cathode designs have the following configurations of cathode active formulations:

SVO (100-x)%/current collector/SVO (100-y)%/current collector/SVO (100-z)%, wherein x, y and z represent percentages of non-active materials and wherein x and z are greater than y, or SVO (100-x)%/current collector/SVO (100-y)%, wherein x and y represent percentages of non-active materials with the x being greater than y and the 100-x% active formulation facing the anode.

Cathode components for incorporation into an electrochemical cell according to the present invention may be prepared by rolling, spreading or pressing the first and second cathode active formulations onto a suitable current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate (EMC), methyl propyl carbonate, ethyl propyl carbonate, diethyl carbonate (DEC), dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode for a primary cell is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

A preferred electrolyte for a secondary cell of an exemplary carbon/$LiCoO_2$ couple comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The assembly of the primary and secondary cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of either the exemplary primary or secondary cell of the present invention. As is well known to those skilled in the art, the exemplary primary and secondary electrochemical systems of the present invention can also be constructed in case-positive configuration.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
 a) an anode;
 b) a cathode comprising a first formulation of a cathode active material and non-active materials short circuited with a second formulation of the cathode active material and non-active materials, the first formulation having a greater percentage of the cathode active material than the second formulation, wherein the cathode active material of the first and second formulations is the same and wherein the non-active materials of the first and second formulations need not be the same; and
 c) an electrolyte activating the anode and the cathode.

2. The electrochemical cell of claim 1 wherein the cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

3. The electrochemical cell of claim 1 wherein the non-active materials are selected from a binder material and a conductive additive.

4. The electrochemical cell of claim 3 wherein the binder material is a fluoro-resin powder.

5. The electrochemical cell of claim 3 wherein the conductive additive is selected from the group consisting of carbon, graphite powder, acetylene black, titanium powder, aluminum powder, nickel powder, stainless steel powder, and mixtures thereof.

6. The electrochemical cell of claim 1 wherein the cathode has the configuration of cathode active formulations: cathode active material (100-x)%/current collector/cathode active material (100-y)%/current collector/cathode active material (100-z) %, wherein x, y and z represent percentages of non-active materials and wherein x and z are greater than y and wherein the cathode active materials are the same.

7. The electrochemical cell of claim 1 wherein the cathode has the configuration of cathode active formulations: cathode active material (100-x)%/current collector/cathode active material (100-y)%/current collector/cathode active material (100-x)%, wherein x and y represent percentages of non-active materials and wherein x is greater than y and wherein the cathode active materials are the same.

8. The electrochemical cell of claim 1 wherein the cathode has the configuration of cathode active formulations: cathode active material (100-v)%/current collector/cathode active material (100-w)%/cathode active material (100-y)%/cathode active material (100-x) %/current collector/cathode active material (100-z)%, wherein v, w, x, y and z represent percentages of non-active materials and wherein v, w, x and z are greater than y and wherein the cathode active materials are the same.

9. The electrochemical cell of claim 1 wherein the cathode has the configuration of cathode active formulations: cathode active material (100-x)%/current collector/cathode active material (100-y)%, wherein x and y represent percentages of non-active materials and wherein x is greater than y with the formulation cathode active material (100-x)% facing the anode and wherein the cathode active materials are the same.

10. The electrochemical cell of claim 1 wherein the cathode has the configuration of cathode active formulations: about 94% silver vanadium oxide/current collector/greater than about 94%, but less than 100% silver vanadium oxide/current collector/about 94% silver vanadium oxide.

11. The electrochemical cell of claim 1 wherein the cathode has the configuration of cathode active formulations: about 94% silver vanadium oxide/current collector/about 94% silver vanadium oxide/greater than about 94%, but less than 100% silver vanadium oxide/about 94% silver vanadium oxide/current collector/about 94% silver vanadium oxide.

12. The electrochemical cell of claim 1 wherein the anode is lithium and the cathode has the configuration of cathode active formulations: about 94% silver vanadium oxide/current collector/greater than about 94%, but less than 100% silver vanadium oxide, with the about 94% silver vanadium oxide facing the lithium anode.

13. The electrochemical cell of claim 1 of either a primary or a secondary chemistry.

14. An electrochemical cell, which comprises:
 a) an anode;
 b) a cathode comprising a first formulation of a cathode active material and non-active materials sandwiched between a first and second current collectors and with a second formulation of the cathode active material and non-active materials contacting at least one of the first and second current collectors opposite the cathode active material of the first formulation and facing the anode, the first formulation having a greater percentage of the cathode active material than the second formulation, wherein the cathode active material of the first and second formulations is the same and wherein the non-active materials of the first and second formulations need not be the same; and c) an electrolyte activating the anode and the cathode.

15. The electrochemical cell of claim 14 wherein the non-active materials are selected from a binder material and a conductive additive.

16. The electrochemical cell of claim 14 wherein the anode is lithium, the second formulation is of silver vanadium oxide present in the formulation at a second percentage of (100-x)%, the first formulation is of silver vanadium oxide present at a first percentage of (100-y)%, wherein x and y represent percentages of non-active materials and wherein x is greater than y and the first and second current collectors are titanium.

17. The electrochemical cell of claim 14 wherein the cathode has the configuration of cathode active formulations: silver vanadium oxide (100-x)%/current collector/silver vanadium oxide (100-y)%/current collector/silver vanadium oxide (100-x)%, wherein x and y represent percentages of non-active materials and wherein x is greater than y.

18. The electrochemical cell of claim 14 wherein the cathode has the configuration of cathode active formulations: silver vanadium oxide (100-x)%/current collector/silver vanadium oxide (100-y)%/current collector/silver vanadium oxide (100-z)%, wherein x, y and z represent percentages of non-active materials and wherein x and z are greater than y.

19. The electrochemical cell of claim 14 wherein the cathode has the configuration of cathode active formulations: $LiCoO_2$ (100-x)%/current collector/$LiCoO_2$ (100-y)%/current collector/$LiCoO_2$ (100-z)%, wherein x, y and z represent percentages of non-active materials and wherein x and z are greater than y.

20. The electrochemical cell of claim 14 wherein the cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

21. The electrochemical cell of claim 14 wherein the first and second current collectors are selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

22. The electrochemical cell of claim 14 wherein the first and second current collectors are titanium having a coating selected from the group consisting of graphite/carbon material, iridium, iridium oxide and platinum provided thereon.

23. The electrochemical cell of claim 14 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

24. The electrochemical cell of claim 23 wherein the first solvent is selected from the group consisting of tetrahydrofuran, methyl acetate, diglyme, triglyme, tetraglyme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

25. The electrochemical cell of claim 14 including a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

26. The electrochemical cell of claim 14 wherein the electrolyte is 0.8M to 1.5M $LiAsF_6$ or $LiPF_6$ dissolved in a 50:50 mixture, by volume, of propylene carbonate and 1,2-dimethoxyethane.

27. The electrochemical cell of claim 14 of either a primary or a secondary chemistry.

28. An electrochemical cell, which comprises:

a) an anode;

b) a cathode comprising a first formulation of a cathode active material and non-active materials contacted to one side of a current collector with a second formulation of the cathode active material and non-active materials contacting the opposite side of the current collector, the first formulation having a greater percentage of the cathode active material than the second formulation, wherein the second formulation faces the anode, and wherein the cathode active material of the first and second formulations is the same and wherein the non-active materials of the first and second formulations need not be the same; and c) a nonaqueous electrolyte activating the anode and the cathode.

29. The electrochemical cell of claim 28 wherein the non-active materials are selected from a binder material and a conductive additive.

30. The electrochemical cell of claim 28 wherein the anode is lithium and the cathode has the configuration of cathode active formulations: silver vanadium oxide (100-x)%/current collector/silver vanadium oxide (100-y)%, wherein x and y represent non-active materials and wherein x is greater than y.

31. The electrochemical cell of claim 28 wherein the anode is lithium and the cathode has the configuration of cathode active formulations: $CF_x$ (100-x)%/current collector/$CF_x$ (100-y)%, with the $CF_x$ (100-x)% facing the anode, wherein x and y represent non-active materials and wherein x is greater than y.

32. The electrochemical cell of claim 28 wherein the cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

33. An electrochemical cell, which comprises:

a) a lithium anode;

b) a cathode comprising a first formulation of a cathode active material selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof, and non-active materials sandwiched between a first and second titanium current collectors with a second formulation of the cathode active material and non-active materials contacting at least one of the first and second current collectors opposite the cathode active material of the first formulation, the first formulation having a greater percentage of the cathode active material than the second formulation, wherein the cathode active material of the first and second formulations is the same and wherein the non-active materials of the first and second formulations need not be the same; and c) a nonagueous electrolyte activating the anode and the cathode.

34. A method for providing an electrochemical cell, comprising the steps of:

a) providing an anode;

b) providing a cathode comprising a first formulation of a cathode active material and non-active materials short circuited with a second formulation of the cathode active material and non-active materials, wherein the first formulation has more of the cathode active material than the second formulation, and wherein the cathode active material of the first and second formulations is the same and wherein the non-active materials of the first and second formulations need not be the same; and c) activating the anode and cathode with an electrolyte activating the anode and the cathode.

35. The method of claim 34 including selecting the cathode active material from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

36. The method of claim 34 including selecting the non-active materials from a binder material and a conductive additive.

37. The method of claim 34 including providing the cathode having the configuration of cathode active formulations: cathode active material (100-x)%/current collector/ cathode active material (100-y)%/current collector/cathode active material (100-x) %, wherein x and y represent percentages of non-active materials and wherein x is greater than y and wherein the cathode active materials are the same.

38. The method of claim 34 including providing the cathode having the configuration of cathode active formulations: cathode active material (100-x)%/current collector/ cathode active material (100-y)%/current collector/cathode active material (100-z)%, wherein x, y and z represent percentages of non-active materials and wherein x and z are greater than y and wherein the cathode active materials are the same.

39. The method of claim 34 including providing the cathode having the configuration of cathode active formulations: cathode active material (100-x)%/current collector/ cathode active material (100-y)%, wherein x and y represent percentages of non-active materials and wherein x is greater than y with the formulation cathode active material (100-x)% facing the anode and wherein the cathode active materials are the same.

40. The method of claim 34 including providing the cathode having the configuration of cathode active formulations: silver vanadium oxide (100-x)%/current collector/ silver vanadium oxide (100-y)%/current collector/silver vanadium oxide (100-z)%, wherein x, y and z represent percentages of non-active materials and wherein x and z are greater than y.

41. The method of claim 34 including providing the cathode having the configuration of cathode active formulations: silver vanadium oxide (100-x)%/current collector/ silver vanadium oxide (100-y)%, and further having the silver vanadium oxide (100-x)% facing the anode, wherein x and y represent percentages of non-active materials and wherein x is greater than y.

42. The method of claim 34 including providing the cathode having the configuration of cathode active formulations: $CF_x$ (100-x)%/current collector/$CF_x$ (100-y)%/ current collector/$CF_x$ (100-z)%, wherein x, y and z represent percentages of non-active materials and wherein x and z are greater than y.

* * * * *

UNITED STATES PATENT AND TRADEMARK OFFICE
CERTIFICATE OF CORRECTION

PATENT NO. : 6,673,493 B2
DATED : January 6, 2004
INVENTOR(S) : Gan et al.

It is certified that error appears in the above-identified patent and that said Letters Patent is hereby corrected as shown below:

Column 10,
Line 38, delete "nonagueous" and insert -- nonaqueous --

Column 11,
Line 14, delete "nonagueous" and insert -- nonaqueous --

Signed and Sealed this

First Day of June, 2004

JON W. DUDAS
*Acting Director of the United States Patent and Trademark Office*